3,310,939
VARIABLE FLOW METERING DEVICES
John Patrick Stewart Curran, Burnley, and Leslie Holliday, Blackburn, England, assignors to Joseph Lucas (Industries) Limited, Birmingham, England, a British company
Filed Sept. 28, 1965, Ser. No. 490,956
5 Claims. (Cl. 60—39.28)

This invention relates to variable flow metering devices for fluids and of the kind comprising a pair of outer sleeves, one of which is fixed and the other of which is axially movable, and an inner tube in sliding engagement with the interior of both outer sleeves, the inner tube having, in its wall, at least one opening having opposite edges diverging in an axial direction of the inner tube, the arrangement being such that the positions of the movable sleeve and of the inner tube relative to the fixed outer sleeve, determine the axial length and circumferential width of the opening which is exposed for the flow of fluid therethrough.

Devices of this kind will be referred to as being of the kind specified.

It has been found in devices of this type, that since the movable outer sleeve has an axially presented face against which the pressure of fluid flowing through the opening acts, there is a tendency for the movable sleeve to move in a direction to increase the exposed opening through which fluid can flow.

To minimise this tendency the present invention has for its object to provide a variable flow metering device in an improved form.

According to the present invention a variable flow metering device of the kind specified is characterised in that one of the outer sleeves has a passageway extending through the wall thereof, said passageway defining a wall which is inclined to the sleeve axis said one outer sleeve overlapping a portion of the other sleeve, to determine the proportion of the passageway which is open for the flow of fluid therethrough.

Figure 1:
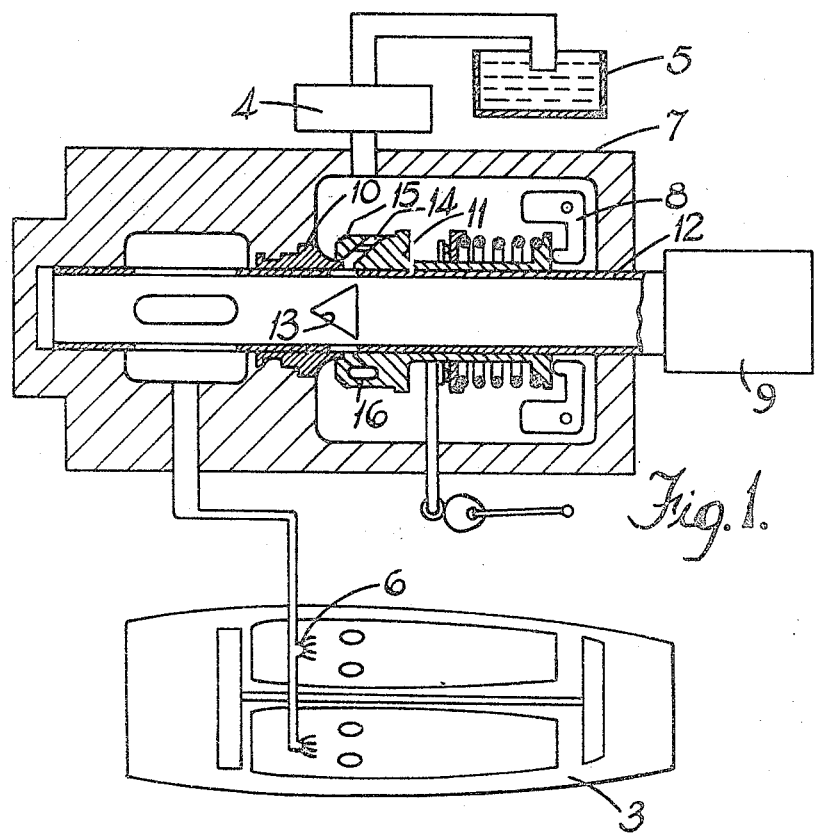
Figure 2:
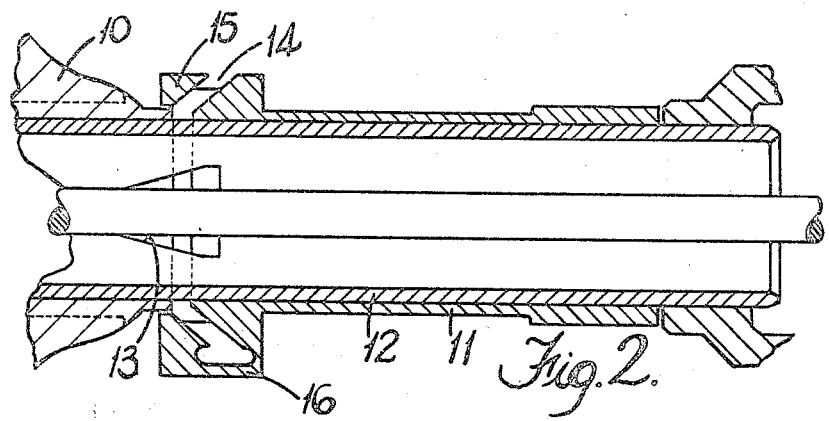

The invention will now be described by way of example with reference to the accompanying drawings in which:

FIGURE 1 is a diagrammatic representation of a fuel system for a gas turbine engine and incorporating a device constructed in accordance with this invention, and FIGURE 2 is a cross-sectional view of the device in the system shown in FIGURE 1.

Referring to FIGURE 1, the fuel system for a gas turbine engine 3 comprises an engine driven pump 4 for supplying fuel from a reservoir 5 to burner nozzle 6 in the engine 3.

Between the pump 4 and the engine 3 is a variable flow metering device comprising a housing 7 to which is fixed or on which is fixed or on which is integrally formed an outer sleeve 10 which is one of a pair of such sleeves. The other outer sleeve 11 is movable axially with respect to the fixed sleeve 10 and both outer sleeves are in sliding engagement with an inner tube 12 which, when the device is in use, is rotated. Furthermore the inner tube 12 is axially movable in relation to the fixed sleeve 10.

The fuel system includes an engine driven governor 8 connected to the movable outer sleeve 11, so that with changing engine speed the outer sleeve 11 is moved axially. The system also includes a fluid pressure sensitive device 9 which is connected to the inner tube 12 to control its axial position, this device 9 being sensitive to changes in pressure in various regions in the engine 3, such as the pressure in the air intake and the pressure at the downstream side of a compressor in the engine 3, these pressures being applied to respective bellows in the device 9.

The inner tube 12 has, in its wall at least one opening 13 of triangular shape, defining two edges which diverge in an axial direction of the inner tube 12.

The positions of the movable sleeve 11 and the inner tube 12 with respect to the fixed sleeve 10 serve to determine the axial length and the circumferential width of the opening 13 which is exposed to permit of the flow of fluid therethrough. The movable outer sleeve 11 has, near its end adjacent to the fixed sleeve 10, an annular passageway 14 formed by a ring 15, secured to the end of the sleeve by means of a plurality of spaced members 16. The ring 15 overlaps a portion of reduced external diameter on the fixed sleeve 10 so that the free end of that portion can cover or uncover the passageway 14 in accordance with travel of the movable outer sleeve 11.

The passageway 14 is, however, inclined to the axes of the sleeves 10, 11 and the inner tube 12 and in the example shown, the angle of inclination is 45°.

In use, any tendency for the movable outer sleeve 11 to move relatively to the fixed sleeve 10 is opposed by an axial force resulting from the flow of fluid through the inclined passageway 14.

In an alternative arrangement (not shown) the passageway is formed in the fixed sleeve 10, which overlaps the movable outer sleeve 11, and again the action of the flow of fluid tends to oppose the force causing movement of the movable outer sleeve.

Having thus described our invention what we claim as new and desire to secure by Letters Patent is:

1. A variable flow metering device for fluids and comprising a fixed outer sleeve, an axially movable outer sleeve, and an inner tube in sliding engagement with the interiors of both the outer sleeves, the inner tube having at least one opening in its wall, said opening having opposite edges diverging in an axial direction of the inner tube, one of the outer sleeves having a passageway inclined to the axial direction of the inner tube and sleeves, said one outer sleeve overlapping a portion of the other outer sleeve to determine the proportion of the passageway which is open for permitting flow of fluid therethrough.

2. A variable flow metering device according to claim 1 in which a ring on said one outer sleeve defines between it and the remainder of the sleeve, the passageway which is annular.

3. A fuel system for a gas turbine engine comprising an engine driven pump for supplying fuel to the engine, a variable flow metering device between the pump and the engine, said variable flow metering device comprising a fixed outer sleve, an axially movable outer sleeve, and an inner tube in sliding engagement with the interiors of both the outer sleeves, the inner tube having at least one opening in its wall, said opening having opposite edges diverging in an axial direction of the inner tube, one of the outer sleeves having a passageway inclined to the axial direction of the inner tube and sleeves, said one outer sleeve overlapping a portion of the other outer sleeve to determine the proportion of the passageway which is open for permitting flow of fluid therethrough, and means for moving the movable sleeve and further means for moving the inner tube, said means and said further means being controlled in accordance with changes in engine conditions.

4. A fuel system according to claim 3 in which the means for moving said movable outer sleeve comprises a device which is responsive to changes in engine speed.

5. A fuel system according to claim 3 in which the further means for moving the inner tube comprises a device which is responsive to changes in pressures in the engine.

No references cited.

JULIUS E. WEST, *Primary Examiner.*